United States Patent
Kalia et al.

(10) Patent No.: US 11,163,964 B2
(45) Date of Patent: Nov. 2, 2021

(54) CONFIGURABLE CONVERSATIONAL AGENT GENERATOR

(71) Applicant: International Business Machines Corporation, Armonk, NY (US)

(72) Inventors: Anup Kalia, Elmsford, NY (US); James R. Kozloski, New Fairfield, CT (US); Clifford A. Pickover, Yorktown Heights, NY (US); Valentina Salapura, Chappaqua, NY (US); Maja Vukovic, New York, NY (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 139 days.

(21) Appl. No.: 16/375,930

(22) Filed: Apr. 5, 2019

(65) Prior Publication Data
US 2020/0320172 A1    Oct. 8, 2020

(51) Int. Cl.
| | |
|---|---|
| G06F 40/56 | (2020.01) |
| G06F 16/332 | (2019.01) |
| G06N 5/04 | (2006.01) |
| G06F 3/0481 | (2013.01) |
| G06F 16/9536 | (2019.01) |
| H04L 12/58 | (2006.01) |
| G10L 13/08 | (2013.01) |

(52) U.S. Cl.
CPC .......... *G06F 40/56* (2020.01); *G06F 3/04817* (2013.01); *G06F 16/3329* (2019.01); *G06F 16/9536* (2019.01); *G06N 5/043* (2013.01); *G10L 13/08* (2013.01); *H04L 51/02* (2013.01)

(58) Field of Classification Search
CPC ............. G06F 16/3329; G06F 16/9536; G06F 3/04817; G06F 40/56; G06N 5/043; G10L 13/08; H04L 51/02
See application file for complete search history.

(56) References Cited

U.S. PATENT DOCUMENTS

| | | | |
|---|---|---|---|
| 8,639,638 B2 | 1/2014 | Shae et al. | |
| 9,369,410 B2 | 6/2016 | Capper et al. | |
| 10,510,088 B2 * | 12/2019 | Jones-McFadden | ......................... G06Q 30/0204 |
| 10,554,590 B2 * | 2/2020 | Cabrera-Cordon | .... G06N 20/00 |

(Continued)

OTHER PUBLICATIONS

Anonymously; "Enrichment of Knowledge Base of Conversational Agents by Active Question Targeting," ip.com, Aug. 10, 2017. pp. 5.

(Continued)

*Primary Examiner* — Angela A Armstrong
(74) *Attorney, Agent, or Firm* — Cantor Colburn LLP; Stosch Sabo

(57) ABSTRACT

Embodiments of the present invention are directed to a computer-implemented method for generating a configurable conversational agent. A non-limiting example of the computer-implemented method includes providing available conversational agents to a user's computing device. The user uses a graphical user interface to choose desired characteristics of a conversational agent. The conversational agent generating service receives the chosen characteristics to generate a customized conversational agent and integrate the conversational agent into the user's system.

20 Claims, 3 Drawing Sheets

(56) References Cited

U.S. PATENT DOCUMENTS

| | | | |
|---|---|---|---|
| 2011/0213808 A1* | 9/2011 | Rheaume | G06F 16/93 |
| | | | 707/802 |
| 2012/0303356 A1* | 11/2012 | Boyle | G06F 40/30 |
| | | | 704/9 |
| 2015/0185996 A1* | 7/2015 | Brown | G06F 3/04817 |
| | | | 715/706 |
| 2015/0286697 A1* | 10/2015 | Byrne | G06F 16/3334 |
| | | | 707/600 |
| 2016/0352658 A1 | 12/2016 | Capper et al. | |
| 2019/0243899 A1* | 8/2019 | Yi | H04M 3/4938 |
| 2020/0137230 A1* | 4/2020 | Spohrer | H04M 3/5191 |

OTHER PUBLICATIONS

Anonymously; "Using Context to Learn Best Communication Mechanisms for Contacting an Individual," ip.com, Jan. 17, 2011. pp. 9.

IBM; "Method to Formulate Efficient DLPAR Decisions," ip.com, Nov. 10, 2008. pp. 3.

Pinhancos dos Santos, LFA et al.; "Chatbots: On Demand Creation of Conversational Agents," Google, Oct. 2015. pp. 103.

Radziwill, N. et al.; "Evaluating Quality of Chatbots and Intelligent Conversational Agents," Google, 2017. Pages.

\* cited by examiner

CONFIGURABLE CONVERSATIONAL AGENT GENERATOR

BACKGROUND

The present invention generally relates to programmable computers, and more specifically, to a system to provide reconfigurable conversational agents configured to generate written or audible natural language and engage in conversation.

A dialogue system or conversational agent (CA) is a computer system configured to communicate with a human using a coherent structure. Dialogue systems employ a variety of communication mechanisms, including, for example, text, speech, graphics, haptics, gestures, and the like for communication on both the input and output channels. Dialogue systems employ various forms of natural language processing (NLP), which is a field of computer science and computational linguistics concerned with the interactions between computers and humans using language. Among the challenges in implementing NLP systems is enabling computers to derive meaning from NL inputs, as well as the effective and efficient generation of NL outputs.

SUMMARY

Embodiments of the present invention are directed to a computer-implemented method for generating a configurable conversational agent. A non-limiting example of the computer-implemented method includes providing available conversational agents to a user's computing device. The user uses a graphical user interface to choose desired characteristics of a conversational agent. The conversational agent generating service receives the chosen characteristics to generate a customized conversational agent and integrates the conversational agent with the user's system.

Embodiments of the present invention are also directed to a system and a computer program product for a logic accelerator having substantially the same features as the computer-implemented method described above.

Additional technical features and benefits are realized through the techniques of the present invention. Embodiments and aspects of the invention are described in detail herein and are considered a part of the claimed subject matter. For a better understanding, refer to the detailed description and to the drawings.

BRIEF DESCRIPTION OF THE DRAWINGS

The specifics of the exclusive rights described herein are particularly pointed out and distinctly claimed in the claims at the conclusion of the specification. The foregoing and other features and advantages of the embodiments of the invention are apparent from the following detailed description taken in conjunction with the accompanying drawings in which:

Figure 1:
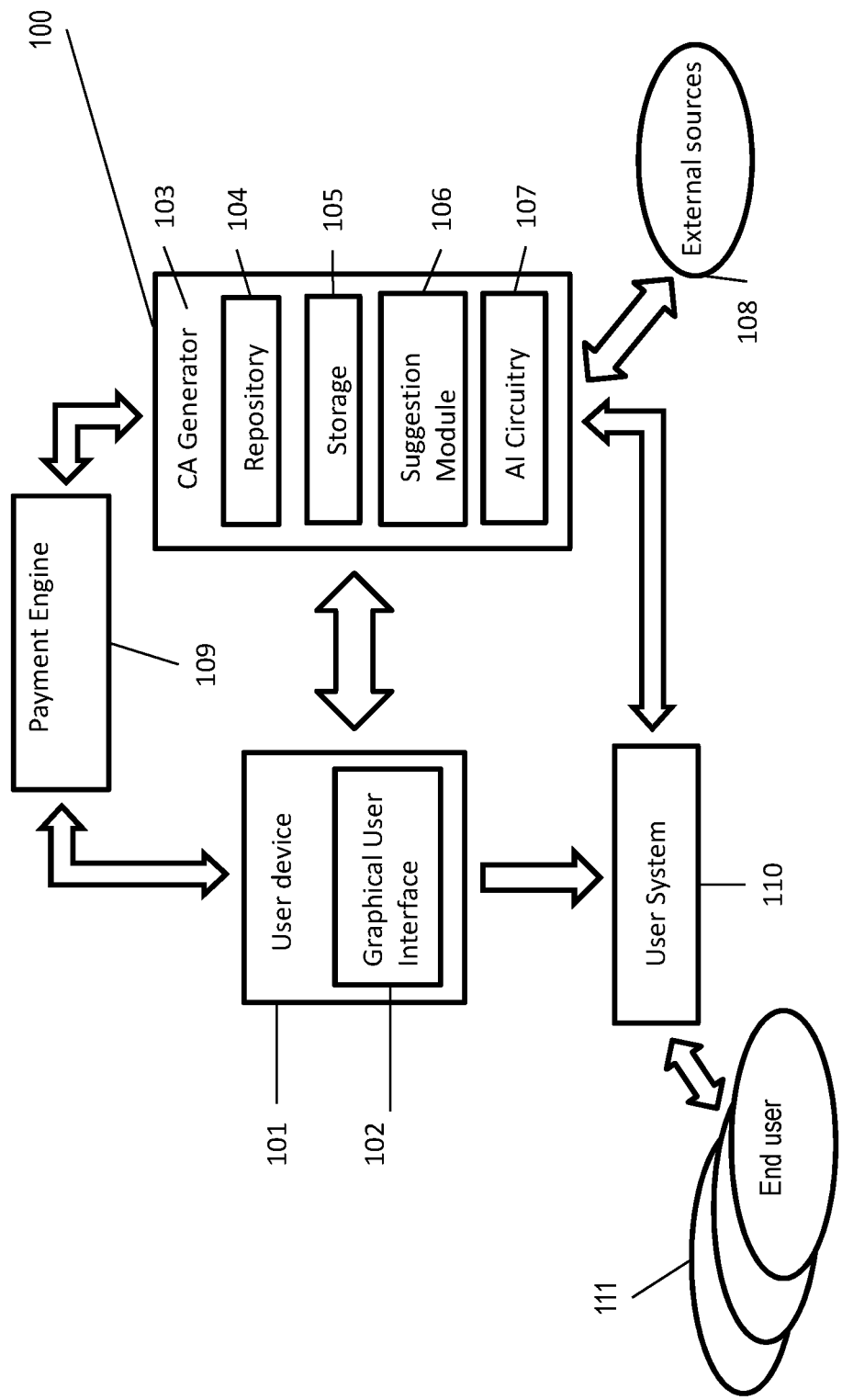
FIG. 1 depicts a block diagram of a system for generating configurable conversational agents for use in implementing one or more embodiments of the present invention.

The diagrams depicted herein are illustrative. There can be many variations to the diagrams or the operations described therein without departing from the spirit of the invention. For instance, the actions can be performed in a differing order or actions can be added, deleted or modified. Also, the term "coupled" and variations thereof describe having a communications path between two elements and does not imply a direct connection between the elements with no intervening elements/connections between them. All of these variations are considered a part of the specification.

In the accompanying figures and following detailed description of the disclosed embodiments of the invention, the various elements illustrated in the figures are provided with two or three digit reference numbers. With minor exceptions, the leftmost digit(s) of each reference number correspond to the figure in which its element is first illustrated.

DETAILED DESCRIPTION

Various embodiments of the invention are described herein with reference to the related drawings. Alternative embodiments of the invention can be devised without departing from the scope of this invention. Various connections and positional relationships (e.g., over, below, adjacent, etc.) are set forth between elements in the following description and in the drawings. These connections and/or positional relationships, unless specified otherwise, can be direct or indirect, and the present invention is not intended to be limiting in this respect. Accordingly, a coupling of entities can refer to either a direct or an indirect coupling, and a positional relationship between entities can be a direct or indirect positional relationship. Moreover, the various tasks and process steps described herein can be incorporated into a more comprehensive procedure or process having additional steps or functionality not described in detail herein.

The following definitions and abbreviations are to be used for the interpretation of the claims and the specification. As used herein, the terms "comprises," "comprising," "includes," "including," "has," "having," "contains" or "containing," or any other variation thereof, are intended to cover a non-exclusive inclusion. For example, a composition, a mixture, process, method, article, or apparatus that comprises a list of elements is not necessarily limited to only those elements but can include other elements not expressly listed or inherent to such composition, mixture, process, method, article, or apparatus.

Additionally, the term "exemplary" is used herein to mean "serving as an example, instance or illustration." Any embodiment or design described herein as "exemplary" is not necessarily to be construed as preferred or advantageous over other embodiments or designs. The terms "at least one" and "one or more" may be understood to include any integer number greater than or equal to one, i.e. one, two, three, four, etc. The terms "a plurality" may be understood to include any integer number greater than or equal to two, i.e. two, three, four, five, etc. The term "connection" may include both an indirect "connection" and a direct "connection."

The terms "about," "substantially," "approximately," and variations thereof, are intended to include the degree of error associated with measurement of the particular quantity based on the equipment available at the time of filing the application. For example, "about" can include a range of ±8% or 5%, or 2% of a given value.

For the sake of brevity, conventional techniques related to making and using aspects of the invention may or may not be described in detail herein. In particular, various aspects of computing systems and specific computer programs to implement the various technical features described herein are well known. Accordingly, in the interest of brevity, many conventional implementation details are only mentioned briefly herein or are omitted entirely without providing the well-known system and/or process details.

Turning now to an overview of technologies that are more specifically relevant to aspects of the invention. Conversational agents are software algorithms that receive, interpret, and respond to humans in natural language. Typically, conversational agents are divided into generative-rule-, or retrieval-based models. In each of these instances, the conversational agents are trained based on decoding an input to understanding the context of an input and formulating an appropriate response. Rule=based models formulate responses based on predetermined rules, generative-based models formulate responses and retrieval-based models retrieve a pre-approved response from a database.

A conversational agent is a computer-implemented algorithm designed to generate a natural language response to simulate human conversation. As used herein, the terms "conversational agent" include but are not limited to chatbots, dialog agents, virtual assistants, chatterbots, or artificial conversational entities. As more companies shift to automated services and providing 24-hour customer service, conversational agents are increasingly deployed to perform routine tasks for human to business and business to business transactions. Conversational agents are used in dialog systems for customer service or information gathering tasks. Conversational agents are also integrated with web-based customer service applications to provide scripted responses to frequently asked questions. In many of these instances, the conversational agent is coupled with an image of a human to provide the illusion of speaking with an actual person. In residential situations, virtual assistant devices and smartphones employ conversational agent algorithms to converse with family members, remember grocery lists, provide weather forecasts, and assist with other household routines.

To accommodate widespread demand for conversational agents, developers design generic one-size fits all conversational agents to service large segments of end users. However, with the increased specialization of end users and services, companies need to integrate specialized conversational agents into their systems to accommodate these more segmented markets. Although businesses do integrate generic conversational agents with their computer systems, these conversational agents lack the appropriate functionality for their customers. Additionally, individuals and businesses lack the information and expertise to design a conversational agent or have the necessary tools to describe any desired conversational agent characteristics. Furthermore, information regarding conversational agents is scattered throughout multiple resources that laypeople may not be aware of, uses multiple terms for the same concepts, and is difficult for a layperson to digest.

Turning now to an overview of the aspects of the invention, one or more embodiments of the invention address the above-described shortcomings of the prior art by providing a user-friendly web-based CA generator system that individuals and businesses can access to build a customized conversational agent. A layperson accesses the CA generator system through the internet and views predesigned conversational agents and information regarding the characteristics of each conversational agent. The information is provided using standard English vocabulary to enable a person without a technical background to understand the meaning of the information. The CA generator system also uses internally or externally collected information to analyze the layperson or his or her business to provide recommendations of desired characteristics for a conversational agent. The layperson uses the information and recommendations to provide the CA generator system with the desired characteristics of a conversational agent.

The mechanisms for customizing the conversational agents are also user-friendly for the layperson. The predesigned conversational agents are presented as modular visual components, in which each visual component represents one or more characteristics. An individual can move around the visual components on a graphical user interface and assemble a desired conversational agent. The individual can also move all the visual components of a conversational agent over the visual components of another conversational agent to create a fused conversational agent that exhibits the personalities of both individual conversational agents. The individuals can also enter textual information describing desired characteristics. The CA generator system includes a dictionary feature including an ontology of concepts. The CA generator system analyzes the text and matches the textual terms to concepts, which are then matched to available conversational agent characteristics.

On the back-end, the CA generator system disassembles and/or combine predesigned conversational agents to isolate the desired characteristics. Once the desired conversational agent is created, the CA generator system integrates the conversational agent into the individual's system to interact with an end-user. The end-users are the customers, users, business partners, or other entities that want to interact with the individual or business.

Turning now to a more detailed description of embodiments of the invention, FIG. 1, depicts a CA generator system 100 for generating a customizable conversational agent in accordance with aspects of the invention. The CA generator system 100 includes a conversational agent generator 103, a repository 104, storage 105, a suggestion module 106, artificial intelligence circuitry 107, and a graphical user interface (GUI) 102 that is transmitted to a user device 101. A user (not shown) accesses the conversational agent generator 103 through a user device 101. The user device 101 can be a mobile computing device, a personal computing device, a work terminal, or any device capable of connecting to the CA generator system 100. The user device 101 is connected to the conversational agent generator through a network (not shown). The network employs either a communications port, a wired transceiver, a wireless transceiver, and/or a network card. The network enables communication using technologies such as Ethernet, fiber optics, microwave, xDSL (Digital Subscriber Line), Wireless Local Area Network (WLAN) technology, wireless cellular technology, Bluetooth technology and/or any other appropriate technology to access the conversational agent generator 103.

The user uses a graphical user interface (GUI) 102 on the user computing device 101 to interact with the conversational agent generator 103. Through the GUI 102, the user is provided a repository 104 of available conversational agents. The repository 104 is indexed based on multiple factors including characteristics and costs. These costs include but are not limited to financial considerations, devices the conversational agent is expected to interact with, and intended commercial use or intended household use. The conversational agents are respectively provided in the form of visual components that each represent one or more characteristics of the conversational agent. The user hovers over or clicks on each individual component to receive information regarding the one or more characteristics that the component represents. The information is provided in standard English such that a layperson would understand the concepts related to the characteristics. Through the GUI 102, the user can change the settings in the CA generator system 100 to receive information that includes progressively more technical vocabulary and requires a more technical background to understand. The settings levels range from a layperson, in which the information is provided at a basic comprehension level to expert, in which the information is provided at a highly technical level. The CA generator system 100 holds a dictionary of technical terms related to conversational agents. The technical terms are linked to synonyms and commonly used terms that laypeople use to use to express the technical terms. The CA generator system 100 also searches documents in external sources, for example, question and answer posting websites, to detect commonly used phrases and words used to express technical terms and concepts. Based on a level chosen by a user, the CA generator system 100 can present information for varying degrees of technical skill level.

The user creates a conversational agent by choosing visual icons for desired characteristics. In some embodiments of the invention, these desired characteristics are based on in-person customer service experience, mobile customer service experience, and bot-to-bot experience.

The GUI 102 includes additional interactive tools to assist the user to customize the desired conversational agent. These tools include sliders, hyperlinks, drop-down menus, or other interactive tools. For example, the sliders are used to provide a price or price range for a conversational agent. The hyperlinks connect the user to external sources that provide additional information on a characteristic of a conversational agent. The drop-down menus provide a menu of available choices of characteristics. The user is also permitted to request characteristics through textual input. The CA generator system 100 is equipped with storage 105, which includes a dictionary of terms and related terms. The dictionary analyzes an ontology of the entered text to determine concepts related to the text. The CA generator system 100 then matches the concepts to characteristics of conversational agents. Based on the matched characteristics the CA generator system 100 returns an icon for the desired characteristic.

The CA generator system 100 also enables a user to upload a pre-existing conversational agent to the CA generator system 100 to either add, modify, or remove features or provide the conversational agent to the repository. The CA generator system 100 disassembles the uploaded conversational agents and determines the individual characteristics, which are then modeled and returned to the user through the CA generator system 100.

In addition, the conversational agent generator 103 is equipped with a suggestion module 106 and artificial intelligence circuitry 107 that accesses online resources to analyze the user's information and make predictions regarding the user's needs. In some embodiments of the invention, the conversational agent generator 103 accesses a user's customer service database to determine an optimal conversational agent for the user. The customer service database includes a log of communication between the user and its customers and is analyzed using natural language processing techniques. Based on the results of the analysis, the suggestion module 106 provides suggestions for characteristics of a conversational agent.

The characteristics of the conversational agent include personalities, competencies, emotions, and interpersonal processes. The conversational agent's personalities are defined through five personality types. The first personality type demonstrates an openness to experience and includes having an active imagination and intellectual curiosity. The second personality demonstrates conscientiousness and is careful, organized, and vigilant. The third personality is extroverted, outgoing and talkative. The fourth personality demonstrates agreeableness and is empathetic and altruistic. The fifth personality demonstrates emotional stability and is calm and even-tempered. The conversational agents either demonstrate one personality or a combination of more than one personality.

The conversational agent's competencies are divided into twelve categories. The first competency is risk-taking, which is related to a conversational agent's ability to respond to an unknown input subject. The second competency is capabilities, which is related to the functions the conversational agent performs. The third competency is technical and management skills including the level of detailed instructions the conversational agent absorbs and its ability to manage instructions. The fourth competency is creativity, which is related to the variety of the provided responses. The fifth competency is judgment, which is related to the choice of a provided response. The sixth competency is quality, which is a measure of the provided response. The seventh competency is reliability, which is a measure of the fidelity of the responses. The eighth competency is flexibility, which is related to an ability to process different inputs related to the same topic. The ninth competency is communication, which is the conversational agent's ability to convey a response effectively. The tenth competency is coordination, which is related to the conversational agent's organizational abilities. The eleventh competency is problem-solving, which is a measure of the complexity of inputs that the conversational agent processes. The twelfth competency is attention to details, which is related to the conversational agent's ability to discern and process all elements of an input.

The CA generator system 100 gives the user the ability to choose conversational agents that are configured to have affective computing functionalities. The conversational agent takes input data including vocabulary, tone of voice, position of an end user, visual data, or other data that may or may not be conveyed by the text of a conversation to make predictions regarding the state of an end user. Visual input data is processed to determine emotions using various techniques including optical flow, hidden Markov models, and neural network processing. CA generator system 100 enables the user to choose to enable the conversational agent to receive data from a passive sensor that detects contextual input data from an end user's environment.

The CA generator system 100 enables users to choose conversational agents based on interpersonal process characteristics. The conversational agents are configured to detect and modify responses based on a conflict with the conversational partner, provide a motivational response, and/or build the partner's confidence. The CA generator system 100 also enables users to choose conversational agents that detect a lack of trust and output responses that build the partner's trust.

The conversational agents are developed to hold individualized characteristics or personalities. These characteristics include a degree of ability to learn, an emulation of a personality, a degree of curiosity, a degree of staying on topic for more than one conversational agent response, a degree of facility in understanding of context or situational awareness, selection of personas, limited or wide scope of conversational topics, recognition that conversation is no longer desired by the other party, mimicking different known personalities, modality of output, and recognition of purpose of conversation.

In some embodiments of the invention, the CA generator system 100 trains conversational agents for conversations that require in-depth knowledge of specialized topics. Different training methods and training data are used to enable specialized understanding from a conversational agent. The conversational agents also acquire specified knowledge by recognizing patterns and topics discussed during human interaction.

The CA generator system 100 initially populates the conversational agent repository by generating different conversational agents that assume different characteristics. Users interact with the GUI 402 to select visual icons that represent each conversational agent to preview their functionality. The GUI 402 also includes input fields that permit the user to only view conversational agents based on specified criteria. For example, the criteria are costs, required infrastructure, equipment, or characteristics. The CA generator system 100 provides the user with a description of each conversational agent's characteristics. The conversational agents are designed around a modular scheme such that end users add and remove features from any individual conversational agent. In one embodiment, the CA generator system 100 includes a drag feature, in which a user drags an icon of one conversational agent over the icon of another conversational agent to select a fused conversational agent. The fused conversational agent includes a combination of characteristics of both conversational agents. In some embodiments of the invention, the CA generator system 100 is configured to add or remove characteristics from the fused conversational agent.

Conversational agents are based on specific profiles, in which each profile is a collection of characteristics that the chatbot exhibits or tasks that the conversational agent performs. These characteristics include but are not limited to computing power required to perform a task, personality, emotional response to user input, language capabilities, trust values for other conversational agents. Tasks include but are not limited to mathematical operations, fetching responses to user input, searching online resources, and adjusting a setting on a connected device. Each characteristic or task performance is enabled by discrete code. For example, the ability to communicate in Spanish is enabled by one set of code, whereas the ability to communicate in English is enabled by another set of code. The storage 105 includes code organized by characteristic or task to be performed. When a user requests a conversational agent with particular characteristics or ability to perform certain tasks, the CA generator system 100 retrieves code from storage 105 associated with the desired characteristic or task and incorporates the code into the conversational agent.

The CA generator system 100 is also enabled to test a conversational agent whose code is unknown. For example, a user may indicate a desire to have a conversational agent similar to a conversational agent found at website x. The CA generator system 100 is enabled to access external sources 108, including website x. The system also stores test inputs in storage 105, which it propounds on the conversational agent at website x. The test inputs include but are not limited to languages, test questions, requests. The CA generator system 100 monitors the responses from the conversational agent and compares those response with stored responses.

The responses from the conversational agent at website x are used to identify its characteristics or task performance ability. For example, the inability to respond to a question in Spanish shows that the conversational agent lacks the ability to communicate in Spanish. The lack of a follow-up questions by the conversational agent at website x indicates a low level of curiosity.

In some embodiments, the characteristics of the conversational agents are built by applying artificial intelligence planning in the development process of the conversational agent. Disassembly of a conversational agent to its characteristic or task related components is performed through similar techniques such as hierarchical planning.

In some embodiments, the artificial intelligence circuitry 107 divides the training phase into an observational phase and a trial and error phase. During the observational phase, the artificial intelligence circuitry 107 applies supervised learning techniques on conversational dialogue to mimic human behavior. In the trial and error phase, the artificial intelligence circuitry 107 applies reinforcement learning techniques to train the conversational agent to react and adapt to inputs in a desired manner. The inputs used during the trial and error phase are not necessarily used during the observational phase and new inputs help train the conversational agent to react to new situations.

In some embodiments of the present invention, the artificial intelligence circuitry 107 is also equipped to train a conversational agent using adversarial learning techniques, for example a generative adversarial network. During adversarial learning training, a generator network creates human like responses to inputs, while a discriminator network works to determine whether the responses are human- or computer-generated. As the generator network is able to pass off responses through the discriminator network without being detected as computer generated, the conversational agent is trained to imitate human responses.

The CA generator system 100 is designed to generate conversational agents that are accessed through various applications. In some embodiments of the invention, the CA generator system 100 generates chatbots for specific global regions. In these instances, the chatbots may have access to localized knowledge bases that include the context of local terms and expressions. For example, the terms lions, tigers, or bears could be a reference to nearby wildlife, or could be related to local sport terms mascots. In some embodiments of the present invention, the CA generator system 100 generates conversational agents that consider local grammar or accents when interpreting an input or formulating a response.

In each instance that a new conversational agent configuration is produced, the CA generator system 100 stores the new conversational agent in storage 106. When the CA generator system 100 is accessed, the CA generator system 100 retrieves a subset of the conversational agents from storage and these conversational agents are held in the repository 104. The conversational agents are retrieved based on a user's specification, suggestions generated by the suggestion module 106, or a random N number of conversational agents. The CA generator system 100 is also equipped with artificial intelligence circuitry 107 to generate predictions of conversational agents that may be desired. The artificial intelligence circuitry 107 takes as inputs the desired specifications, the user's industry, and past conversational agent configurations from similar industries to suggest conversational agent configurations. The artificial intelligence circuitry 107 also accesses external sources 108 such as social media, technical journals, and news outlets to gather information on current business needs and trends and make predictions on potential conversational agent configurations. These predictions are transmitted to the suggestion module 106, which then suggests the configurations to a user. In some embodiments of the invention, the CA generator system 100 generates conversational agents based on the analysis performed by the artificial intelligence circuitry 107.

Figure 2:
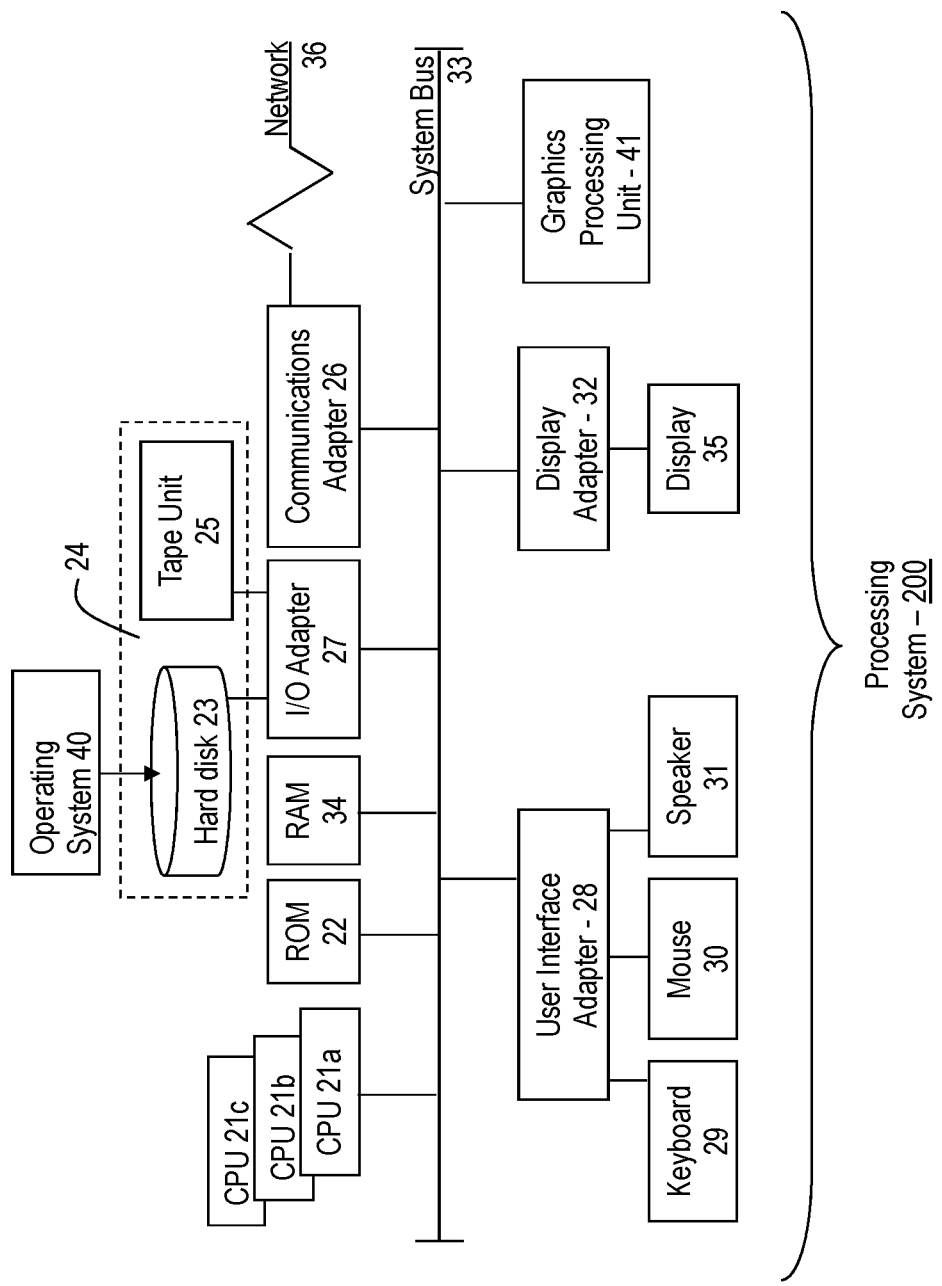
FIG. 2 depicts a block diagram of a computer system for use in implementing one or more embodiments of the present invention.

In embodiments of the invention, the functionality of the artificial intelligence circuitry 107 can be implemented as a machine learning (ML) algorithm executed by the processor 200 (shown in FIG. 2). ML algorithms are also referred to as classifiers or classifier algorithms. The ML algorithm is configured to extract features from received data to "classify" or make predictions about the received data. For example, the artificially intelligence circuitry 107 analyzes information provided by a user. This information can include the user's location, the user's business, the size of the business This information can be provided to the CA generator system 100 by a user, who enters the information in different fields provided through the GUI 102. The AI circuitry 107 uses the information, including any meta-data associated with the information, to compare with similar user's businesses, location, etc. For example, if a user operates a real estate company and specializes in condominiums and commercial buildings, the AI circuitry 107 can analyze conversational agents requested by past users in a similar business to determine if the common conversational agent characteristics were sought. In some other embodiments of the present invention, the AI circuitry 107 accesses websites of similar business and evaluates any conversational agents provided on those websites. The results of the AI circuitry 107 analysis are transmitted to the suggestion module 106 and presented to the user. The AI circuitry 107 stores the data received from other users and through online resources. The AI circuitry 107 records each instance of obtaining new information with a time stamp. Based on a time stamp, the AI circuitry makes predictions on which conversational agent characteristics that similar businesses are implementing, and which characteristics are being abandoned. The results vary based on a user's business and location. For example, conversational agent trends for restaurants in the northern hemisphere may differ from those in the southern hemisphere.

Examples of suitable classifiers include but are not limited to neural networks, support vector machines (SVMs), logistic regression, decision trees, hidden Markov Models (HMMs), etc. The end result of the classifier's operations, i.e., the "classification," is to predict a class for the received data. The ML algorithms, over time, creates/trains/updates one or more unique "model(s)" of conversation agents (i.e., conversational agent models) that will be used to predict the specific conversational model(s) desired by a user. The learning or training performed by the ML algorithms can be supervised, unsupervised, or a hybrid that includes aspects of supervised and unsupervised learning. Supervised learning is when training data is already available and classified/labeled. Unsupervised learning is when training data is not classified/labeled so must be developed through iterations of the ML algorithms (or classifiers). Unsupervised learning utilizes additional learning/training methods including, for example, clustering, anomaly detection, neural networks, deep learning, and the like.

In some embodiments of the invention, the CA generator system 100 includes a payment engine 109 to facilitate a transaction between parties. The payment engine 109 verifies funds and transfer funds directly from the user or by connecting to a third-party financial institution. The CA generator system 100 is further configured to implement the conversational agent on the end user's system 110. In some embodiments of the invention, the user device 101 is included in the user system 110. In other embodiments of the invention, the user device 101 is distinct from the user system 110.

For example, in one instance a user who owns a car dealership accesses the CA generator system 100 through a private mobile computing device or personal computer 101. In another instance, the user accesses the CA generator system 100 through a work terminal 101. Once the CA generator system 100 has created the conversational agent, the CA generator system 100 receives access to user's system and integrates the conversational agent into the car dealership's computer network 110. The integration is performed similarly to integration of conversational agent to a user system by and information technology department. The conversational agent interacts with the end-users, which in this case are people wanting to purchase a car.

Referring to FIG. 2, there is shown an embodiment of a processing system 200 for implementing the teachings herein. In this embodiment, the system 200 has one or more central processing units (processors) 21a, 21b, 21c, etc. (collectively or generically referred to as processor(s) 21). In one or more embodiments of the invention, each processor 21 may include a reduced instruction set computer (RISC) microprocessor. Processors 21 are coupled to system memory 34 and various other components via a system bus 33. Read only memory (ROM) 22 is coupled to the system bus 33 and may include a basic input/output system (BIOS), which controls certain basic functions of system 200.

FIG. 2 further depicts an input/output (I/O) adapter 27 and a network adapter 26 coupled to the system bus 33. I/O adapter 27 may be a small computer system interface (SCSI) adapter that communicates with a hard disk 23 and/or tape storage drive 25 or any other similar component. I/O adapter 27, hard disk 23, and tape storage device 25 are collectively referred to herein as mass storage 24. Operating system 40 for execution on the processing system 200 may be stored in mass storage 24. A network adapter 26 interconnects bus 33 with an outside network 36 enabling data processing system 200 to communicate with other such systems. A screen (e.g., a display monitor) 35 is connected to system bus 33 by display adaptor 32, which may include a graphics adapter to improve the performance of graphics intensive applications and a video controller. In one embodiment, adapters 27, 26, and 32 may be connected to one or more I/O busses that are connected to system bus 33 via an intermediate bus bridge (not shown). Suitable I/O buses for connecting peripheral devices such as hard disk controllers, network adapters, and graphics adapters typically include common protocols, such as the Peripheral Component Interconnect (PCI). Additional input/output devices are shown as connected to system bus 33 via user interface adapter 28 and display adapter 32. A keyboard 29, mouse 30, and speaker 31 all interconnected to bus 33 via user interface adapter 28, which may include, for example, a Super I/O chip integrating multiple device adapters into a single integrated circuit.

In exemplary embodiments of the invention, the processing system 200 includes a graphics processing unit 41. Graphics processing unit 41 is a specialized electronic circuit designed to manipulate and alter memory to accelerate the creation of images in a frame buffer intended for output to a display. In general, graphics processing unit 41 is very efficient at manipulating computer graphics and image processing and has a highly parallel structure that makes it more effective than general-purpose CPUs for algorithms where processing of large blocks of data is done in parallel.

Thus, as configured in FIG. 2, the system 300 includes processing capability in the form of processors 21, storage capability including system memory 34 and mass storage 24, input means such as keyboard 29 and mouse 30, and output capability including speaker 31 and display 35. In one embodiment, a portion of system memory 34 and mass storage 24 collectively store an operating system coordinate the functions of the various components shown in FIG. 2.

Figure 3:
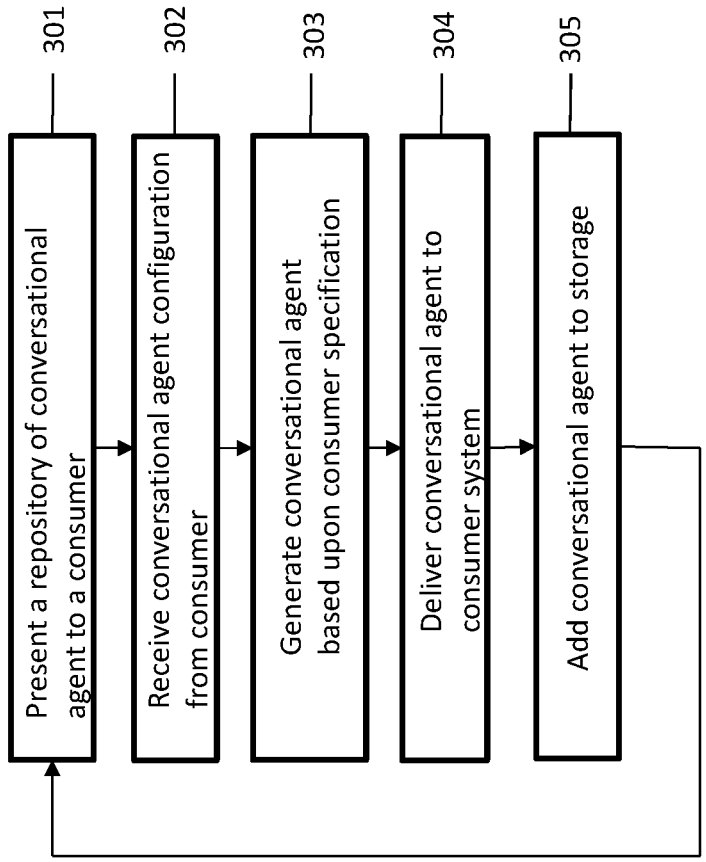
FIG. 3 depicts a flow diagram of a method for generating configurable conversational agents according to one or more embodiments of the invention.

FIG. 3 depicts a flow diagram of a method 300 for generating configurable conversational agents according to one or more embodiments of the invention. The method 300 can be implemented by the CA generator system 100 (shown in FIG. 1). At block 301, the CA generator system 100 presents a repository of conversational agents to a user through a graphical user interface (GUI) 102. The repository 104 contains a subset of available conversational agents that the system has in storage 105. The GUI 102 is further configured to provide the user with interactive tools to choose desired characteristics. For example, the GUI 102 includes a slider that moves along a given price range. As the user moves the slider, the CA generator system 100 is configured to remove and add conversational agents from the repository 104 to only display conversational agents within the desired price range. The tools are also configured to permit the user to only display conversational agents based on desired characteristics. For example, a user can click on entries in a drop-down menu to indicate a list of desired characteristics.

The user is also able to use the GUI 102 to move a cursor across a visual icon of a conversational agent and receive information regarding a characteristic. The GUI 107 is also configured to permit the user to drag either individual pieces or entire conversational agents to drop over another conversational agent. The CA generator system 100 interprets this as a fused conversational agent. The user uses the above referenced methods to provide the CA generator system 100 with the desired characteristics of a conversational agent at block 302. The CA generator system 100 generates the conversational agent at block 303. The CA generator system 100 updates the user's system to integrate the conversational agent at block 304. In some embodiments, the CA generator system 100 only integrates the conversational agent into a portion of the user's system 110 to perform a test run on the conversational agent. The conversational agent is integrated with the user's webpage or the conversational agent is integrated into user's client software or other desired delivery methods. Once integrated, end users interact with the user or business through the conversational agents. The conversational agent is then added to storage and is later retrieved by another user at block 305.

Additional processes may also be included. It should be understood that the processes depicted in FIG. 3 represent illustrations, and that other processes may be added or existing processes may be removed, modified, or rearranged without departing from the scope and spirit of the present disclosure.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the end user's computer, partly on the end user's computer, as a stand-alone software package, partly on the end user's computer and partly on a remote computer or entirely on the remote computer or server. In the latter scenario, the remote computer may be connected to the end user's computer through any type of network, including a local area network (LAN) or a wide area network (WAN), or the connection may be made to an external computer (for example, through the Internet using an Internet User). In some embodiments of the invention, electronic circuitry including, for example, programmable logic circuitry, field-programmable gate arrays (FPGA), or programmable logic arrays (PLA) may execute the computer readable program instruction by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments described herein.

What is claimed is:

1. A computer-implemented method for generating configurable conversational agents, the method comprising:
   accessing, by a processor, a customer service database to analyze a communication log between a user and a customer to determine desired conversational agent personality characteristics;
   retrieving, by the processor, a plurality of available conversational agents based on the determined desired conversational agent personality characteristics;
   providing, by the processor, the plurality of available conversational agents to the user, and a textual description of the available conversational agents using commonly used terms appropriate for a layperson;
   receiving, by the processor, an input to replace the textual description of the available conversational agents to a technical description;
   accessing, by the processor, a dictionary of that links the commonly used terms with technical terms;
   providing, by the processor, the plurality of available conversational agents to the user, and a textual description of the available conversational agents that replaces the commonly used terms with the technical terms;
   receiving, by the processor, a text of desired characteristics of a conversational agent from the user;
   matching the text to conversational agent concepts from an ontology;
   generating, by the processor, a conversational agent with the desired characteristics based at least in part on the matched conversational agent concepts; and
   integrating, by the processor, the generated conversational agent with a system of the user.

2. The computer-implemented method of claim 1, wherein the plurality of available conversational agents is provided to the user through visual icons that include information regarding each conversational agent's characteristics.

3. The computer-implemented method of claim 1 further comprising:
   accessing, by the processor, data from external sources;
   analyzing, by artificial intelligence circuitry, the data from the external sources;
   predicting, by the artificial intelligence circuitry, conversational agent trends based on the analysis of the data from the external sources;
   generating, by the processor, a conversational agent based on the predicted conversational agent trends; and
   integrating, by the processor, the conversational agent generated based on the predicated conversational agent trends with the user's system.

4. The computer-implemented method of claim 1, wherein the desired characteristics are selected from a group consisting of openness to experience, conscientiousness, extroversion, agreeableness, and emotional stability.

5. The computer-implemented method of claim 1, wherein the desired characteristics are selected from a group consisting of risk-taking, capabilities, technical and management skills, creativity, judgment, quality, reliability, flexibility, communication, coordination, problem-solving, and attention to details.

6. The computer-implemented method of claim 1, wherein the desired characteristics include affective computing functionalities.

7. The computer-implemented method of claim 1, wherein the plurality of available conversational agents includes retrieval-based conversational agents and generative-based conversational agents.

8. A system for generating configurable conversational agents, the system comprising:
a processor communicatively coupled to a memory, the processor configured to:
access a customer service database to analyze a communication log between a user and a customer to determine desired conversational agent personality characteristics;
retrieve a plurality of available conversational agents based on the determined desired conversational agent personality characteristics;
provide the plurality of available conversational agents to the user, and a textual description of the available conversational agents using commonly used terms appropriate for a layperson;
receive an input to replace the textual description of the available conversational agents to a technical description;
access a dictionary of that links the commonly used terms with technical terms;
provide the plurality of available conversational agents to the user, and a textual description of the available conversational agents that replaces the commonly used terms with the technical terms;
receive a text of desired characteristics of a conversational agent from the user;
match the text to conversational agent concepts from an ontology;
generate a conversational agent with the desired characteristics based at least in part on the matched conversational agent concepts; and
integrate the generated conversational agent with a system of the user.

9. The system of claim 8, wherein the plurality available conversational agents is provided to the user through visual icons that include information regarding each conversational agent's characteristics.

10. The system of claim 8, wherein the processor is further configured to:
access data from external sources including social media, technical journals, and news outlets;
analyze, using artificial intelligence circuitry, the data from the external sources;
predict, using the artificial intelligence circuitry, conversational agent trends based on the analysis of the data from external sources;
generate a conversational agent based on the predicted conversational agent trends; and
integrate the conversational agent generated based on the predicated conversational agent trends with the user's system.

11. The system of claim 8, wherein the desired characteristics are selected from a group consisting of openness to experience, conscientiousness, extroversion, agreeableness, and emotional stability.

12. The system of claim 8, wherein the desired characteristics are selected from a group consisting of risk-taking, capabilities, technical and management skills, creativity, judgment, quality, reliability, flexibility, communication, coordination, problem-solving, and attention to details.

13. The system of claim 8, wherein the desired characteristics include affective computing functionalities.

14. The system of claim 8, wherein the plurality of available conversational agents includes retrieval-based conversational agents and generative-based conversational agents.

15. A computer program product for generating configurable conversational agents, the computer program product comprising a computer readable storage medium having program instructions embodied therewith, the instructions executable by a processor to cause the processor to:
access a customer service database to analyze a communication log between a user and a customer to determine desired conversational agent personality characteristics;
retrieve a plurality of available conversational agents based on the determined desired conversational agent personality characteristics;
provide the plurality of available conversational agents to the user, and a textual description of the available conversational agents using commonly used terms appropriate for a layperson;
receive an input to replace the textual description of the available conversational agents to a technical description;
access a dictionary of that links the commonly used terms with technical terms;
provide the plurality of available conversational agents to the user, and a textual description of the available conversational agents that replaces the commonly used terms with the technical terms;
receive a text of desired characteristics of a conversational agent from the user;
match the text to conversational agent concepts from an ontology;
generate a conversational agent with the desired characteristics based at least in part on the matched conversational agent concepts; and
integrate the generated conversational agent with a system of the user.

16. The computer program product of claim 15, wherein the plurality of available conversational agents is provided to the user through visual icons that include information regarding each conversational agent's characteristics.

17. The computer program product of claim 15, wherein the processor is further configured to:
access data from external sources including social media, technical journals, and news outlets;
analyze, using artificial intelligence circuitry, the data from the external sources;
predict, using the artificial intelligence circuitry, conversational agent trends based on the analysis of the data from external sources;
generate a conversational agent based on the predicted conversational agent trends; and
integrate the conversational agent generated based on the predicated conversational agent trends with the user's system.

18. The computer program product of claim 15, wherein the desired characteristics are selected from a group consisting of openness to experience, conscientiousness, extroversion, agreeableness, and emotional stability.

19. The computer program product of claim 15, wherein the desired characteristics are selected from a group consisting of risk-taking, capabilities, technical and management skills, creativity, judgment, quality, reliability, flexibility, communication, coordination, problem-solving, and attention to details.

20. The computer program product of claim 15, wherein the desired characteristics include affective computing functionalities.

\* \* \* \* \*